United States Patent [19]

Powers et al.

[11] Patent Number: 4,509,728
[45] Date of Patent: Apr. 9, 1985

[54] MOLTEN METAL FILTRATION INDICATOR

[75] Inventors: Frank M. Powers; Robert H. Ogletree, both of Carrollton, Ga.

[73] Assignee: Southwire Company, Carrollton, Ga.

[21] Appl. No.: 541,214

[22] Filed: Oct. 12, 1983

[51] Int. Cl.³ .............................................. C22B 9/00
[52] U.S. Cl. ...................................... 266/44; 266/94; 266/95; 266/99; 75/93 R
[58] Field of Search ....................... 266/93, 94, 95, 99, 266/44; 75/93 R; 73/305, 309, 312, 317, 322

[56] References Cited

U.S. PATENT DOCUMENTS

| | | | |
|---|---|---|---|
| 2,495,416 | 1/1950 | McCauley | 73/305 |
| 2,627,178 | 2/1953 | Hayward et al. | 73/305 |
| 2,816,334 | 12/1957 | Edstrand | 266/95 |
| 4,277,281 | 7/1981 | Webert et al. | 75/93 R |

Primary Examiner—L. Dewayne Rutledge
Assistant Examiner—S. Kastler
Attorney, Agent, or Firm—Herbert M. Hanegan

[57] ABSTRACT

A molten metal filter effectiveness indicator comprising means for detecting the molten metal level on at least one side of a molten metal filter, and method.

1 Claim, 2 Drawing Figures

MOLTEN METAL FILTRATION INDICATOR

TECHNICAL FIELD

The present invention relates generally to molten metal filters, and specifically to an apparatus for measuring the efficiency of a molten metal filter and for indicating the malfunction of a molten metal filter.

BACKGROUND ART

U.S. Pat. Nos. 2,429,584; 3,537,987; 3,610,600; 3,820,767; 3,904,180; 3,972,709; 4,067,731; and references therein are among the numerous patents illustrating that filtering and degasing of molten metal are generally well known in the art. The in-line use of disposable porous ceramic foam filters for filtering molten aluminum are shown in U.S. Pat. Nos. 4,007,923; 3,917,242; 3,893,917; 3,962,081 and 4,092,153. A continuous filter for molten copper is disclosed in U.S. Pat. No. 4,277,281.

Since molten metal filters of the type shown in U.S. Pat. No. 4,277,281 are partially or completely submerged in molten metal during the filtering process, it is not possible to determine the effectiveness of the filter without analysis of the cast product resulting from the filtered melt. Since considerable time is required for the filtering, laundering, casting, rolling, cooling and analysis processes, a great deal of contaminated metal is processed before the defective filtering is realized. Typical defects which can result in insufficiently filtered metal are filters which are cracked or otherwise damaged during shipment, handling or installation and filters which are not properly fitted in the tundish or filterbowl. Cracks in such filters tend to open during preheating or operation which allows unfiltered metal to pass through the system, causing unacceptably high inclusions. During normal operation, the filter gradually becomes clogged, resulting in a considerable head difference between the entrance side of the filter and the exit side of the filter. A normal head is expected in the filtering process and is relied upon in the filtering process to maintain proper metal flow rate required for casting. However, where a crack is present in the filter, a normal head build up is not present and cannot be relied upon to control metal flow, and improper filtration results. In addition, where the molten metal filter becomes overly clogged, insufficient metal flow results.

The present invention solves these problems by providing an apparatus for indicating the effectiveness of a molten metal filter to prevent undue restriction of flow and to prevent production of an insufficiently filtered metal product.

DISCLOSURE OF INVENTIONS

The present invention is a molten metal filter flow effectiveness indicator. It comprises means for determining the change in molten metal level on at least one side of the molten metal filter. This apparatus records changes in the molten metal level on at least one side of the molten metal filter including subtle changes which might otherwise go unnoticed. In this manner, the effectiveness of the molten metal filter can be continuously monitored in order to prevent the processing of contaminated metal while assuring a productive molten metal filtering rate.

Therefore, a major object of this invention is to provide a molten metal filter effectiveness indicator.

Another object of this invention is to prevent the casting of unfiltered metal.

Still another object of this invention is to provide means for detecting overly clogged molten metal filters.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompaning drawings in which like parts are given like identification numerals and wherein;

BEST MODE FOR CARRYING OUT THE INVENTION

Figure 1:
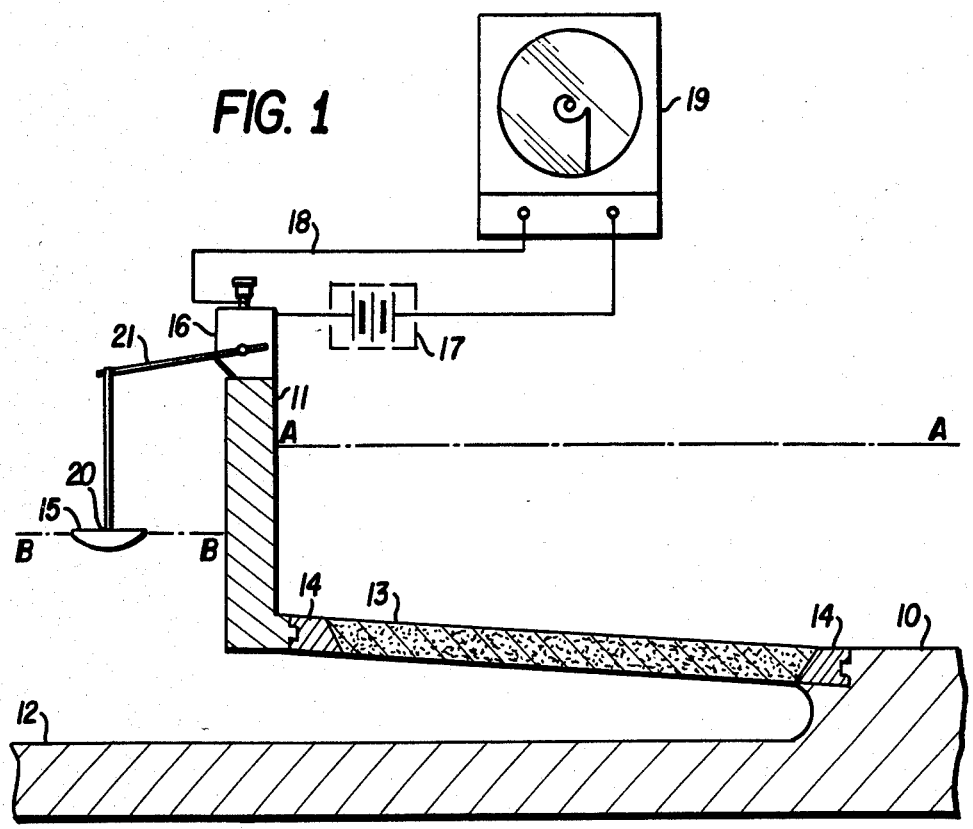
FIG. 1 is a cross-sectional view of a portion of a molten metal tundish having a molten metal filter and the present invention.

The present invention is a molten metal filteration flow effectiveness indicator. As FIG. 1 illustrates, tundish 10 comprises an upper chamber 11 and a lower chamber 12. Unfiltered molten metal is poured into upper chamber 11 and passes through molten metal filter 13 to lower chamber 12. Filter 13 is typically held in position by silicon-carbide seating tiles 14. Molten metal is poured into upper chamber 11 in a controlled manner to reach and maintain a predetermined upper level indicated by line A-A. As the molten metal begins to filter through filter 13, it flows into lower chamber 12 and on to further processing. Molten metal is continuously poured into upper chamber 11 until molten metal in lower chamber 12 reaches a predetermined level indicated by line B-B. The difference between the upper molten metal level A-A and the lower molten metal level B-B is typically refered to as the head. Under normal operating conditions with a properly working filter 13, the head has a range of acceptable values which are determined by certain variables such as the configuration of the tundish 10, configuration of the filter 13 and the type molten metal being processed.

It is preferred that the measured metal level is on the down stream side of filter 13 because the upper molten metal level A-A is directly controlled by pouring while the lower molten metal level B-B depends upon the flow of metal through filter 13. The present invention comprises molten metal level detection means 15, data converting unit 16, power source 17, data transmitting means 18, and data recorder 19. Molten metal level detection means 15 comprises a high temperature ceramic float 20 and and indication lever 21. Variations in molten metal level B-B are sensed by float 20 which is connected to lever 21. Lever 21 indicates level changes to converting unit 16 which converts the sensed date to a signal. Powered by power supply 17, the signal is transmitted to recorder 19 by transmitting means 18.

Figure 2:
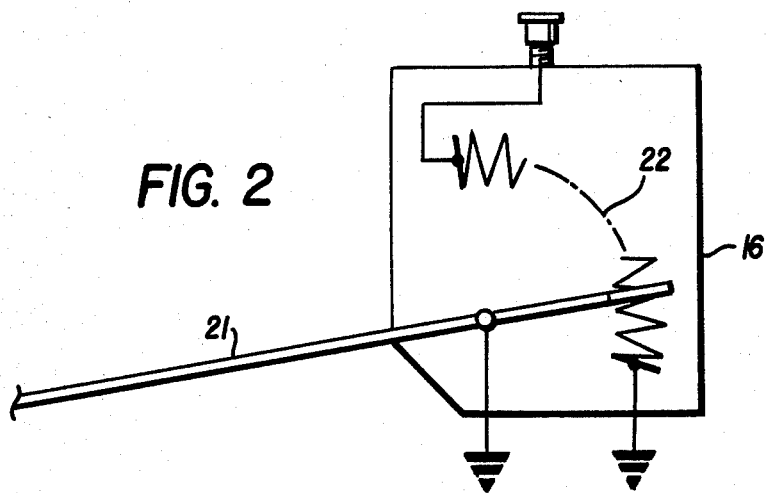
FIG. 2 is an elevation of the sending unit of the present invention.

Referring now to FIG. 2, data converting unit 16 further comprises a variable resistance type potentiometer 22. Potentiometer 22 is connected in series with DC power source 17 of FIG. 1 which has sufficient voltage to result in a mV output from potentiometer 22 which is transmitted by transmitting means 18 of FIG. 1 to recorder 19 of FIG. 1. Recorder 19 is preferably a 24 hour recorder. As molten metal level B-B changes. The mV output to recorder 19 varies, resulting in a visible data change at recorder 19. Thus, drastic changes in molten metal level B-B, such as those caused by cessation of the pouring of molten metal into upper chamber 11 and free flow of molten metal through defects or cracks in filter 13 are immediately recorded. In addition, gradual clogging of filter 13 to unacceptably restrictive levels is indicated by the present apparatus, as well as developing defects in filter 13 which cause gradual increase in molten metal level B-B. In this manner, the effectiveness of filter 13 is continuously monitored to prevent the processing of unfiltered metal while maintaining productive molten metal flow.

While this invention has been described in detail with particular reference to a preferred imbodiment thereof, it will be understood that variations and modifications can be effective within the spirit and scope of the invention as described hereinbefore and as defined in the appended claims.

INDUSTRIAL APPLICABILITY

This invention is capable of expoitation in the molten metal filtering industry and is particularly useful in a system for detecting the effectiveness of a molten metal filter.

I claim:

1. A method of detecting the effectiveness of a molten metal filter in a molten metal tundish of the type having a first chamber for molten metal, a second chamber for molten metal, and a molten metal filter means disposed between said first and second chambers for filtering molten metal between said chambers, including the steps of:

pouring molten metal into the first chamber;

filtering said molten metal from the first chamber into the second chamber through said filter means;

sensing the level of molten metal in one of said chambers;

converting the sensed molten metal level into a signal;

monitoring said level signal as a function of time to detect the rate of change of the level of molten metal; and determining the effectiveness of said filter means based on the rate of change of the level of molten metal.

* * * * *